United States Patent
Rafn

(10) Patent No.: US 10,341,178 B1
(45) Date of Patent: Jul. 2, 2019

(54) CONFIGURING CLIENT DEVICES

(71) Applicant: Amazon Technologies, Inc., Seattle, WA (US)

(72) Inventor: Mark Edward Rafn, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 123 days.

(21) Appl. No.: 15/269,616

(22) Filed: Sep. 19, 2016

(51) Int. Cl.
*G06Q 50/00* (2012.01)
*H04L 12/24* (2006.01)
*H04L 29/08* (2006.01)
*H04L 12/58* (2006.01)
*H04W 4/50* (2018.01)
*H04L 29/06* (2006.01)

(52) U.S. Cl.
CPC .......... *H04L 41/0816* (2013.01); *H04L 51/18* (2013.01); *H04L 51/32* (2013.01); *H04L 67/306* (2013.01); *H04W 4/50* (2018.02); *G06Q 50/01* (2013.01); *H04L 63/102* (2013.01)

(58) Field of Classification Search
CPC ..... H04L 41/0816; H04L 51/18; H04L 51/32; H04L 4/50; H04L 67/306; H04L 63/102; G06Q 50/01
See application file for complete search history.

(56) References Cited

U.S. PATENT DOCUMENTS

| | | | |
|---|---|---|---|
| 8,988,232 B1 | 3/2015 | Sloo | |
| 9,094,407 B1 | 7/2015 | Matthieu | |
| 9,641,400 B2 | 5/2017 | Britt | |
| 9,860,123 B2 | 1/2018 | Herger | |
| 9,881,470 B2 | 1/2018 | Baynes | |
| 9,917,824 B2 | 3/2018 | Britt | |
| 2009/0326800 A1 | 12/2009 | Kalaboukis | |
| 2013/0041951 A1 | 2/2013 | Lee | |
| 2013/0297078 A1* | 11/2013 | Kolavennu | G05D 23/1917 700/276 |
| 2013/0331087 A1 | 12/2013 | Shoemaker | |
| 2014/0087709 A1* | 3/2014 | Nielsen | H04W 4/50 455/418 |
| 2015/0019710 A1 | 1/2015 | Shaashua | |
| 2015/0264731 A1* | 9/2015 | Lin | H04L 67/26 455/41.2 |
| 2015/0317066 A1 | 11/2015 | Saxena | |
| 2015/0369705 A1 | 12/2015 | Kruglick | |
| 2015/0381662 A1 | 12/2015 | Nair | |
| 2016/0234595 A1 | 8/2016 | Goran | |
| 2016/0285708 A1* | 9/2016 | Papadopoulos | H04L 67/10 |
| 2016/0301638 A1 | 10/2016 | Chen | |
| 2016/0308686 A1 | 10/2016 | Vijayrao | |
| 2017/0019390 A1 | 1/2017 | Gu | |

* cited by examiner

*Primary Examiner* — John M Macilwinen
(74) *Attorney, Agent, or Firm* — Knobbe, Martens, Olson & Bear, LLP

(57) ABSTRACT

A communication system and method for the utilization of social networks to provide computing devices operational information. The computing devices access one or more social networks and associate with an account of a specified user. The computing devices can maintain social network profiles that provide configuration information of the computing device. The computing devices can process information provided profile updates to cause a configuration of the client device. The computing devices can also process social network communications to process operational parameters of the client device.

20 Claims, 16 Drawing Sheets

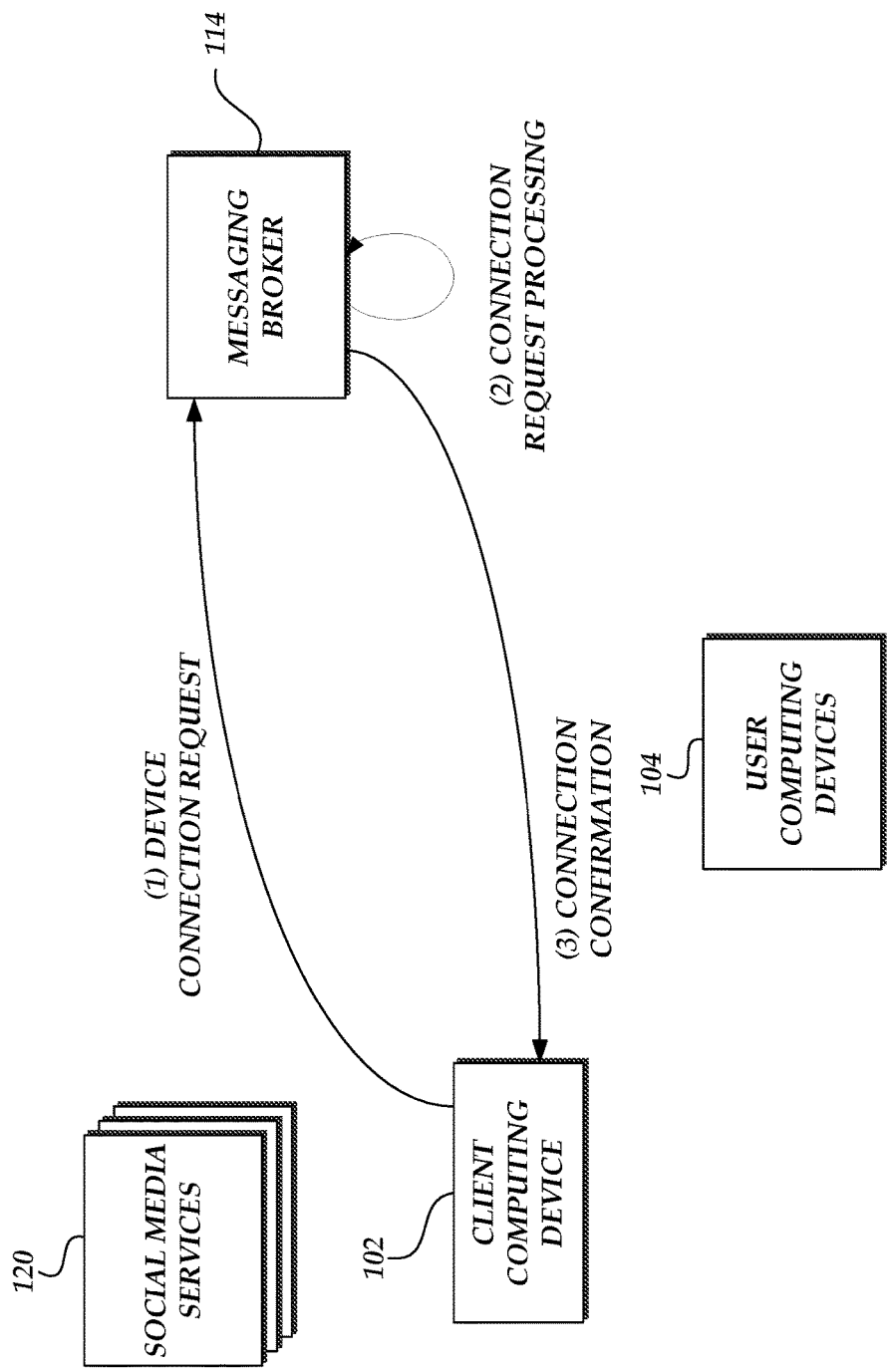

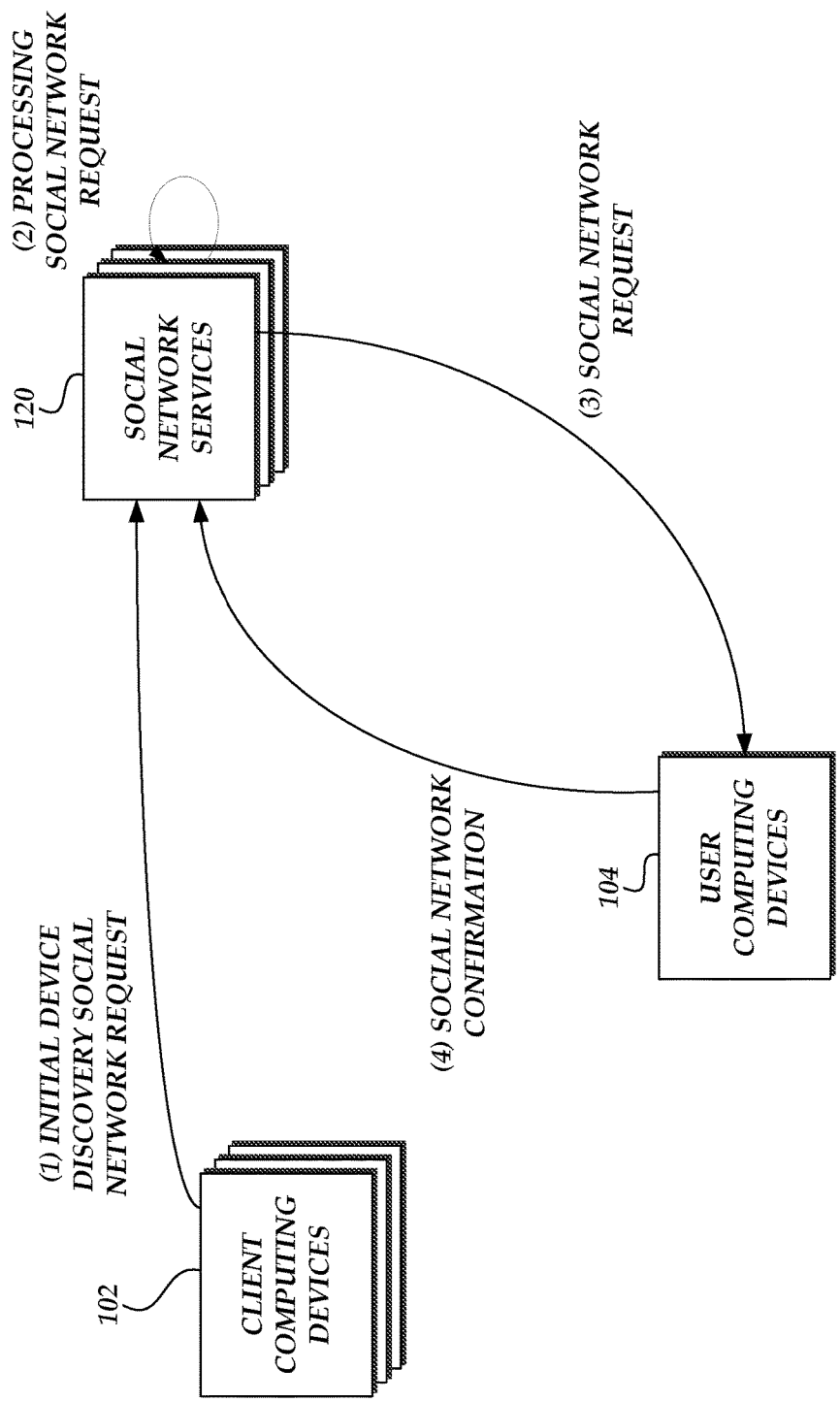

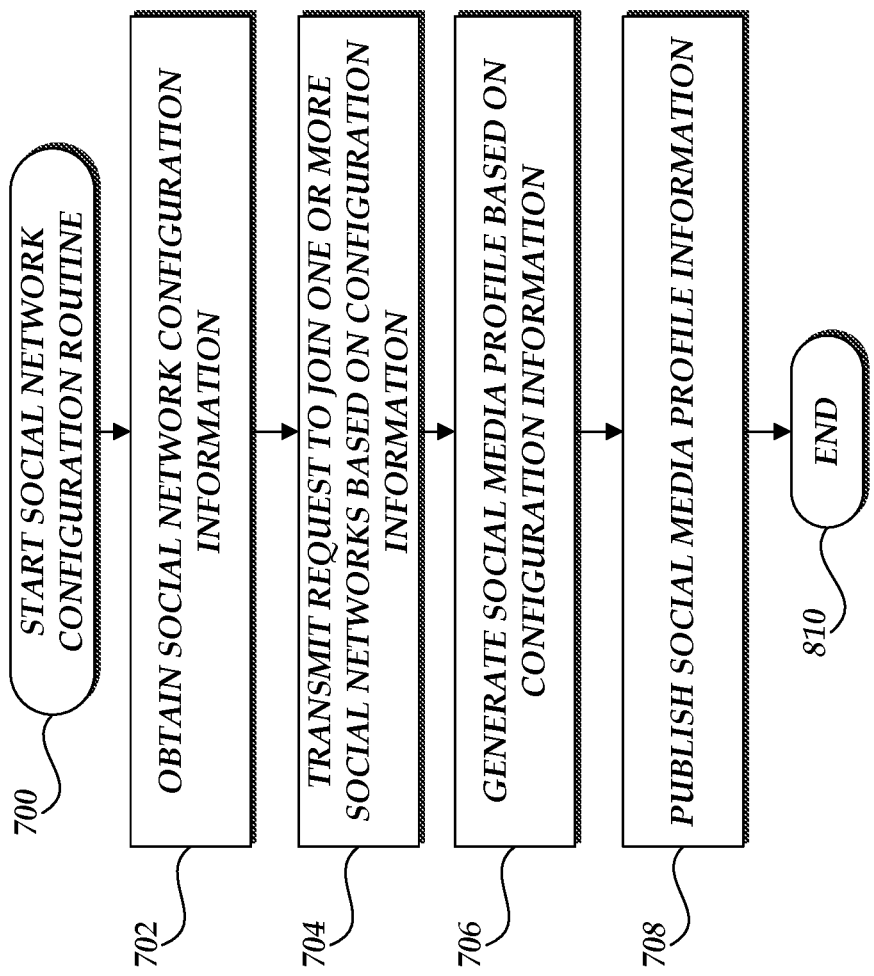

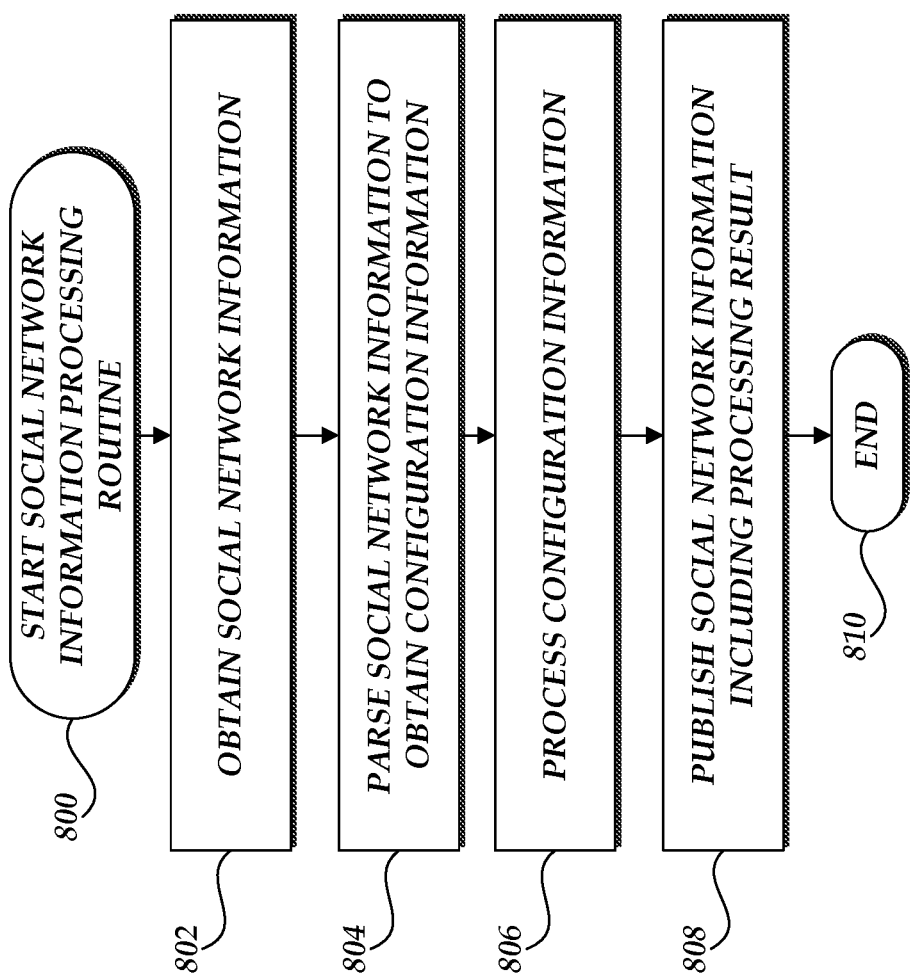

US 10,341,178 B1

CONFIGURING CLIENT DEVICES

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing machine to host one or more instances of virtual machines that appear and operate as independent computer machines to a connected computer user. With virtualization, a single physical computing device can create, maintain, or delete virtual machines in a dynamic manner. In turn, users can request computer resources from a data center and be provided with varying numbers of virtual machine resources on an "as needed" or "as requested" basis. In addition to virtual machines, a data center may provide other computing resources, including hardware computing capacity, data storage space, network bandwidth, and the like.

In some environments, the computing devices that communicate via the communication network can correspond to devices having a primary function as a computing device, such as a desktop personal computer. In other environments, at least some portion of the computing devices that communication via the communication network can correspond to embedded devices or thin devices that have at least one alternative primary function, such as household appliances having a separate primary purpose (e.g., a thermostat or refrigerator) while also providing at least limited computing functionality.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIG. 5A-5C are block diagrams of the communication management environment of FIG. 1 illustrating the interaction related to client device for obtaining configuration information via social network services in accordance with an illustrative embodiment;

FIG. 6A-6F are block diagrams of the communication management environment of FIG. 1 illustrating the interaction between the illustrated components for client device configuration via social network services;

FIG. 7 is a flow diagram illustrative of a social network configuration routine implemented by a client device in accordance with an illustrative embodiment; and FIG. 8 is a flow diagram illustrative of a social network information processing routine implemented by a client device in accordance with an illustrative embodiment.

DETAILED DESCRIPTION

Figure 1:
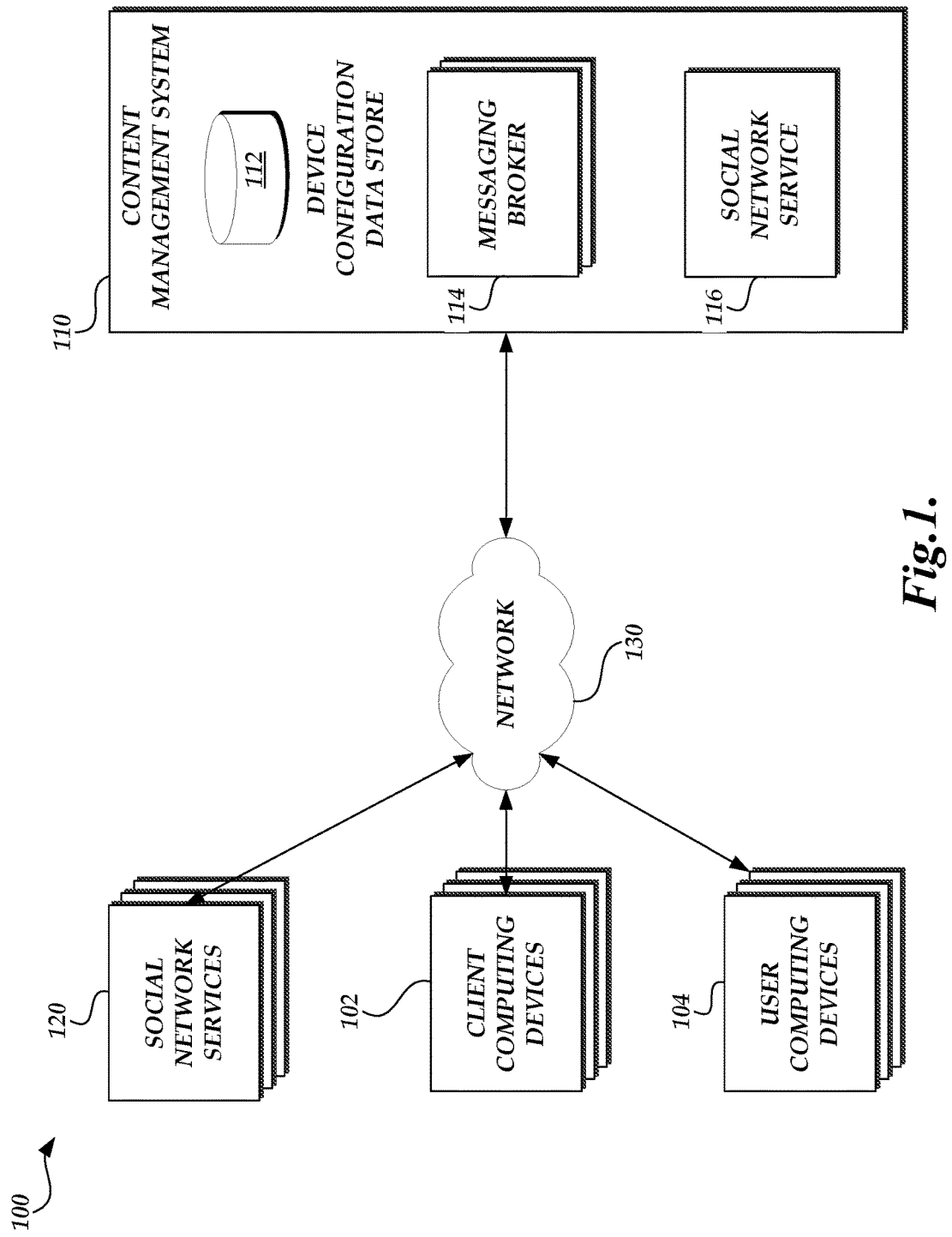
FIG. 1 is a block diagram of a communication management environment that includes one or more client devices, one or more user devices, one or more social networks and a content management system according to one embodiment.

Generally described, the present application corresponds to the management of data transmitted between computing devices in a communication network. More specifically, aspects of the present application correspond to the utilization of social network services to configure client devices and exchange information related to the operation of client devices. Illustratively, one or more client devices include network connectivity sufficient to exchange information with various social networks or social networking resources, such as Web sites. In a first aspect, some of the client devices may correspond to devices in which the computing functionality is not the sole function of the device, such as appliances that have embedded computing resources. Additionally, many of these devices do not have traditional input or output controls that facilitate the configuration of the client devices by a user. Nonetheless, many of the client devices may configured to communicate via a messaging protocol, such as the MQTT messaging protocol, to exchange content. Additionally, the client devices can also include some form of data connectivity applications, such as browser applications or portions of browser components, that facilitate communication with social networks.

In accordance with aspects of the present application, one or more client devices can be configured to the preferences of individual users or as part of a grouping of client devices, such as in a home, business or other logical or physical organizational criteria. To facilitate the configuration, the client devices communicate with a social network service to make a connection with a particular user or administrator of the grouping of client devices. In one example, the client devices can obtain social network identifiers of the particular user or administrator and request to make a connection. In another example, the client devices can publish availability to make a connection via a social network and accept a connection request from the specific user or administrator. In a further example, a social network service can also be utilized to model a grouping of client devices and to create social network profiles that are common or complimentary to each client device and include profile information associated with a specified user/administrator.

Once a connection with the specific user or administrator has been established, the client devices can be configured utilizing information provided through various communication mechanism provided by the social network. In one aspect, each client device can be associated with a specific social network profile that identifies one or more operational criteria of the client device. The client device can publish (or make available) the social network profile and receive updates to the social network profiles from the specific user or administrator. Additionally, the at least portions of social network profile information from one or more users may be utilized to update or supplement the client device social profiles. The updates to the social network profiles can be processed to result in a configuration of the client devices, such as operating parameters, communication preferences, security settings, and the like.

In another aspect, each client device can also utilize the communication platforms provided by the social networks to receive information from the specific user or administrator or to publish information to specific user or administrator. For example, the specific user or administrator can publish a message directly to the client device via the social network that includes a specific command (e.g., turn on) or attribute (e.g., a temperature setting) that is received and processed by the client device. In another example, the specific user or administrator may publish a message indirectly to the client device (e.g., a group post) that can be parsed by the client device to implement some action (e.g., "on my way home" can be processed to cause a client device operating home lights to enter a select program. In a further example, the client devices can also publish information related to the operational characteristics of the client device. The published information can include processing results (e.g., error codes or success confirmation) or specific readings (e.g., the number of times a door has been opened or a security code utilized). Additionally, in some embodiments, a service provider can utilize additional resources, such as virtualized representations of the client devices, to facilitate the processing of the social network communications and provide at least a portion of the processing communication information, such as the configuration information, to the client device.

Although aspects of some embodiments described in the disclosure will focus, for the purpose of illustration, on the MQTT messaging protocol and other illustrative social networking platforms, one skilled in the relevant art will appreciate that the examples are illustrative only and are not necessarily intended to be limiting.

FIG. 1 is a block diagram depicting an illustrative logical network 100 including multiple client computing devices 102 and user devices 104 in communication with a content management system 110 and one or more content providers implementing social networks 120 via a network 130. While the client computing devices 102 and user devices 104 are shown as a group within FIG. 1, the client computing devices 102 and user devices 104 individually or as a grouping may be geographically distant, and independently owned or operated. For example, the client computing devices 102 or client devices 102 could represent a multitude of client devices within a specific home or office. In another example, the client computing devices 102 could be part of a grouping of multiple of devices associated with an organization, such as number of computing components associated with various devices in different geographic areas. Similarly, while one set of illustrative components is shown to represent the content management system 110 and network service providers 120, multiple instances of each component may be present within the content management system 110, and such components may be located within geographically diverse areas (e.g., globally, continentally, or regionally), in order to provide a wide geographical presence for the content management system 110. Likewise, social network service providers 120 represent any number of computing devices or other components utilized by a content provider to facilitate the delivery, processing and storage of content via the network 130.

Network 130 may be any wired network, wireless network, or combination thereof. In addition, the network 130 may be a personal area network, local area network, wide area network, cable network, satellite network, cellular telephone network, or combination thereof. In the example environment of FIG. 1, network 130 is a global area network (GAN), such as the Internet. Protocols and components for communicating via the other aforementioned types of communication networks are well known to those skilled in the art of computer communications and thus, need not be described in more detail herein. While each of the client computing devices 102, admin devices 104, and content management system 110 is depicted as having a single connection to the network 130, individual components of the client computing devices 102, admin devices 104, and content management system 110 may be connected to the network 130 at disparate points. Accordingly, communication times and capabilities may vary between the components of FIG. 1.

Client computing devices 102 may include any number of different computing devices capable of communicating with the content management system 110 and social networks 120. For example, individual accessing computing devices may correspond to a laptop or tablet computer, personal computer, wearable computer, server, personal digital assistant (PDA), hybrid PDA/mobile phone, mobile phone, electronic book reader, set-top box, camera, appliance, controller, digital media player, and the like. Each client computing device 102 may optionally include one or more data stores (not shown in FIG. 1) including various applications or computer-executable instructions, such as web browsers, used to implement the embodiments disclosed herein. On an individual basis, client computing devices 102 may generally have access to fewer computing resources (e.g., processing power, memory, persistent storage space, electronic power, network communication capabilities, input and output capabilities, etc.) than the user computing devices 104 and content management system 110. Illustrative components of a client computing device 102 will be described with regard to FIGS. 2 and 2A. In one embodiment, the client computing devices 102 can be referred to an Internet of Things ("IOT") devices representative of a class of devices in which computing functionality can be embedded within devices having at least one additional alternative functionality. Examples include, but are not limited to, household appliances, controls for various other devices, consumer goods, and the like.

Similar to the client computing devices 102, the user computing devices 104 may include any number of different computing devices capable of communicating with the content management system 110. For example, individual accessing computing devices may correspond to a laptop or tablet computer, personal computer, wearable computer, server, personal digital assistant (PDA), hybrid PDA/mobile phone, mobile phone, electronic book reader, set-top box, camera, digital media player, and the like. Each client computing device 104 may optionally include one or more data stores (not shown in FIG. 1) including various applications or computer-executable instructions, such as web browsers, used to implement the embodiments disclosed herein. Illustrative components of a user computing device 104 will be described with regard to FIG. 3. For purposes of illustration, user computing devices 104 are representative of a class of devices having increased available computing resources, including the ability for input and output mechanisms typically exemplified with interaction with social networks 120.

In accordance with embodiments, the content management system 110 includes one or more servers for implementing messaging broker services 114, one or more social network services 116 for facilitating the configuration of communications between the client devices 102 and the social networks 120, and a device configuration data store 112. As described in further detail below, the messaging services 114 can receive implement network based messaging protocols, such as MQTT, to facilitate communications between the client devices 102 and the social networks 120. Illustrative components of a messaging server 114 will be described with regard to FIG. 4.

It will be appreciated by those skilled in the art that the content management system 110 may have fewer or greater components than are illustrated in FIG. 1. Thus, the depiction of the content parsing system 110 in FIG. 1 should be taken as illustrative. For example, in some embodiments, components of the content management system 110, such as the messaging service 114, may be executed by one more virtual machines implemented in a hosted computing environment. A hosted computing environment may include one or more rapidly provisioned and released computing resources, which computing resources may include computing, networking or storage devices.

Figure 2:
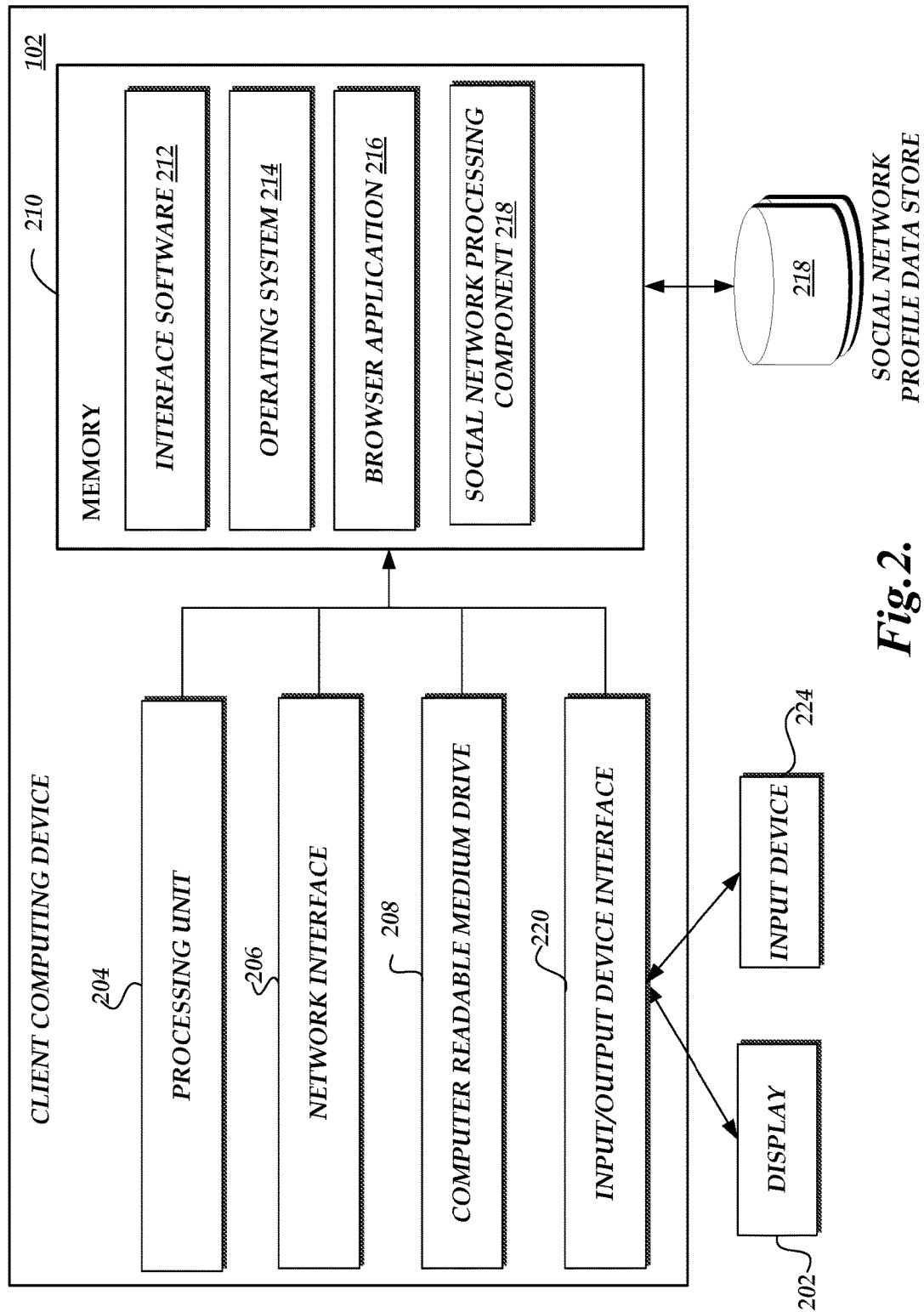
FIGS. 2 and 2A are block diagrams of illustrative components of a limited resource client computing device configured to remotely process content in accordance with an illustrative embodiment.

FIG. 2 depicts one embodiment of an architecture of an illustrative client computing device 102 that can generate and process social network information in accordance with the present application. The general architecture of the client computing device 102 depicted in FIG. 2 includes an arrangement of computer hardware and software components that may be used to implement aspects of the present disclosure. As illustrated, the client device 102 includes a processing unit 204, a network interface 206, a computer readable medium drive 207, an input/output device interface 220, an optional display 202, and an input device 224, all of which may communicate with one another by way of a communication bus. Illustratively, the client computing device 102 may have more limited functionality and components, such as inputs or outputs, as embedded devices.

The network interface 206 may provide connectivity to one or more networks or computing systems, such as the network 130 of FIG. 1. The processing unit 204 may thus receive information and instructions from other computing systems or services via a network. The processing unit 204 may also communicate to and from memory 210 and further provide output information for an optional display 202 via the input/output device interface 220. The input/output device interface 220 may also accept input from the optional input device 224, such as a keyboard, mouse, digital pen, etc. In some embodiments, the client 102 may include more (or fewer) components than those shown in FIG. 2. For example, some embodiments of the client computing device 102 may omit the display 202 and input device 224, while providing input/output capabilities through one or more alternative communication channel (e.g., via the network interface 206). Additionally, the client device 102 may omit the input and output interface 220 altogether as well.

The memory 210 may include computer program instructions that the processing unit 204 executes in order to implement one or more embodiments. The memory 210 generally includes RAM, ROM, or other persistent or non-transitory memory. The memory 210 may store an operating system 214 that provides computer program instructions for use by the processing unit 204 in the general administration and operation of the client 102. The memory 210 may further include computer program instructions and other information for implementing aspects of the present disclosure. For example, in one embodiment, the memory 210 includes a browser application 216 for accessing content. Illustratively, the browser application 216 may encompass a full software browser application, portions of a browser application or simply be a software application (or executable instructions) that provide for data connectivity. The memory 210 may further include a social network component 218 for communicating with and processing information from one or more social networks 120. The client computing devices 102 can further include a social network data store 218 for maintaining social network configuration or profile information for facilitating communication with the social networks 120.

Figure 2A:
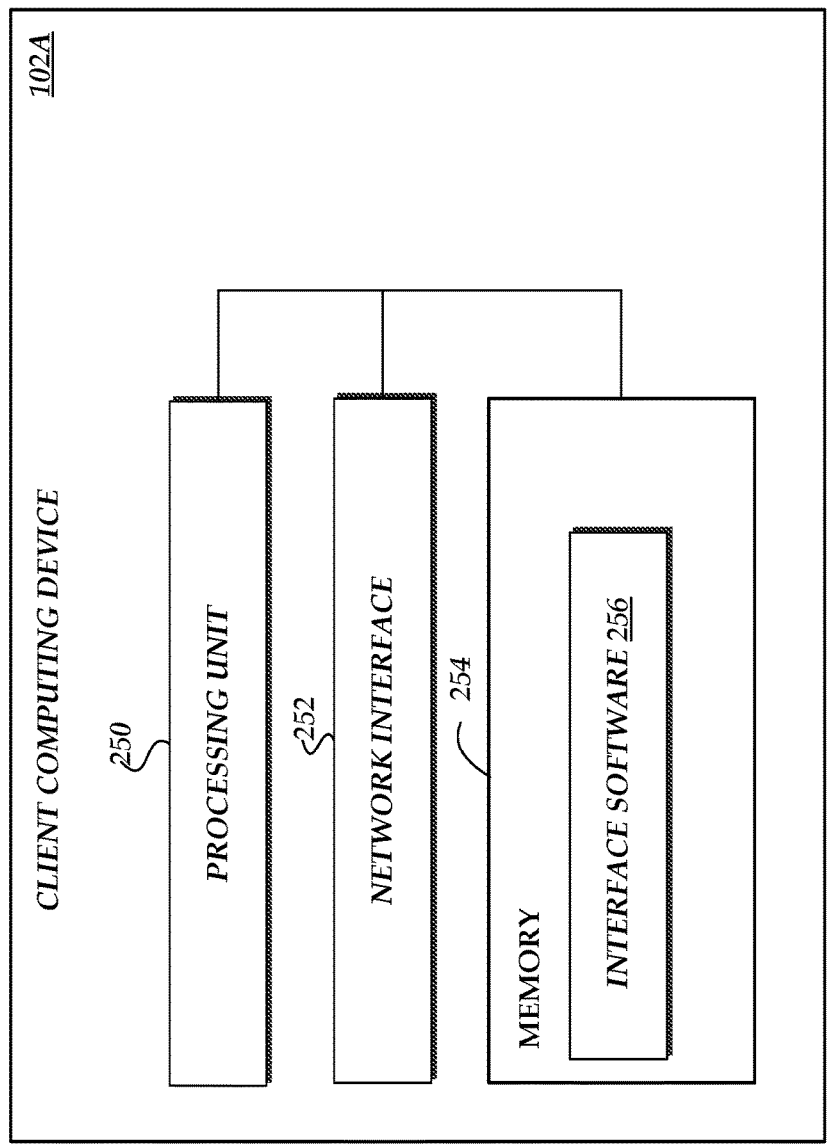

FIG. 2A depicts one embodiment of an alternative architecture of an illustrative client computing device 102A that can generate and process social network information or be utilized in conjunction with the generation and processing of social network information in accordance with the present application. The general architecture of the client computing device 102A depicted in FIG. 2 includes an arrangement of computer hardware and software components that may be used to implement aspects of the present disclosure. However, client computing device 102A may be associated with a reduced of components that may limit the computing functionality and operation of the client device 102A. As illustrated, the client device 102A includes a processing unit 250 and a network interface 252 that communicate with a communication bus. Unlike client device 102 (FIG. 2), the client device 102 may not have a computer readable medium drive, an input/output device interface, an optional display, or an input device.

The network interface 252 may provide connectivity to one or more networks or computing systems, such as the network 130 of FIG. 1. The processing unit 250 may thus receive information and instructions from other computing systems or services via a network. The memory 254 may include computer program instructions that the processing unit 250 executes in order to implement one or more embodiments. The memory 254 generally includes RAM, ROM, or other persistent or non-transitory memory. In this embodiment, the memory 254 may store necessarily store a full operating system that provides computer program instructions for use by the processing unit 250 in the general administration and operation of the client 102A. Rather, in one embodiment, the memory 254 includes an interface software component 256 for accessing receiving and processing instructions.

Figure 3:
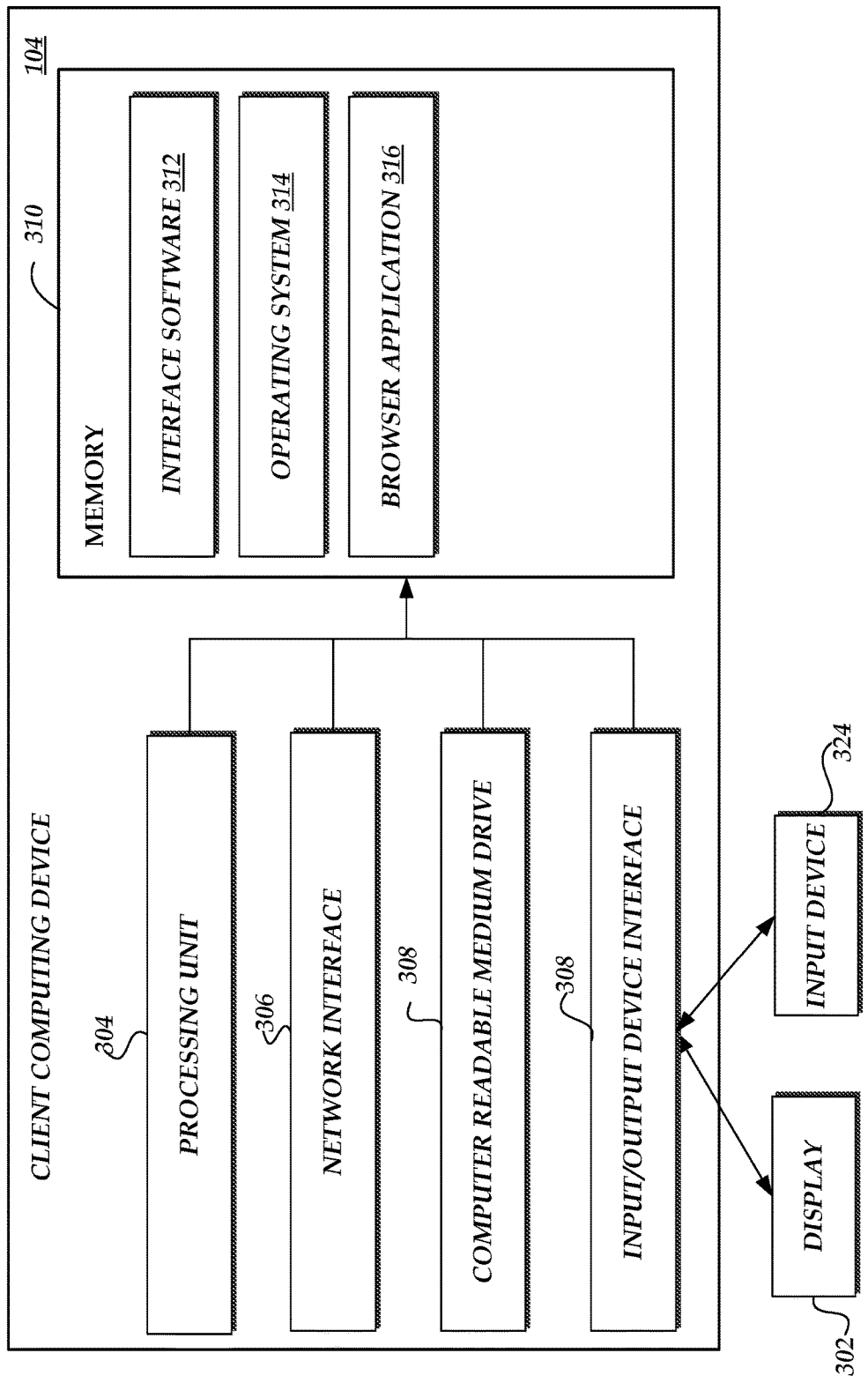
FIG. 3 is a block diagram of illustrative components of a client computing device configured to remotely process content in accordance with an illustrative embodiment.

FIG. 3 depicts one embodiment of an architecture of an illustrative user computing device 104 that can generate and process social network information in accordance with the present application. The general architecture of the user computing device 104 depicted in FIG. 3 includes an arrangement of computer hardware and software components that may be used to implement aspects of the present disclosure. As illustrated, the user computing device 104 includes a processing unit 304, a network interface 306, a computer readable medium drive 307, an input/output device interface 330, an optional display 302, and an input device 224, all of which may communicate with one another by way of a communication bus.

The network interface 306 may provide connectivity to one or more networks or computing systems, such as the network 130 of FIG. 1. The processing unit 304 may thus receive information and instructions from other computing systems or services via a network. The processing unit 304 may also communicate to and from memory 310 and further provide output information for an optional display 302 via the input/output device interface 330. The input/output device interface 330 may also accept input from the optional input device 324, such as a keyboard, mouse, digital pen, etc. In some embodiments, the user computing device 104 may include more (or fewer) components than those shown in FIG. 3.

The memory 310 may include computer program instructions that the processing unit 304 executes in order to implement one or more embodiments. The memory 310 generally includes RAM, ROM, or other persistent or non-transitory memory. The memory 310 may store an operating system 314 that provides computer program instructions for use by the processing unit 304 in the general administration and operation of the user computing device 104. The memory 310 may further include computer program instructions and other information for implementing aspects of the present disclosure. For example, in one embodiment, the memory 310 includes a browser application 316 for accessing content and communicating with and processing information from one or more social networks 120.

Figure 4:
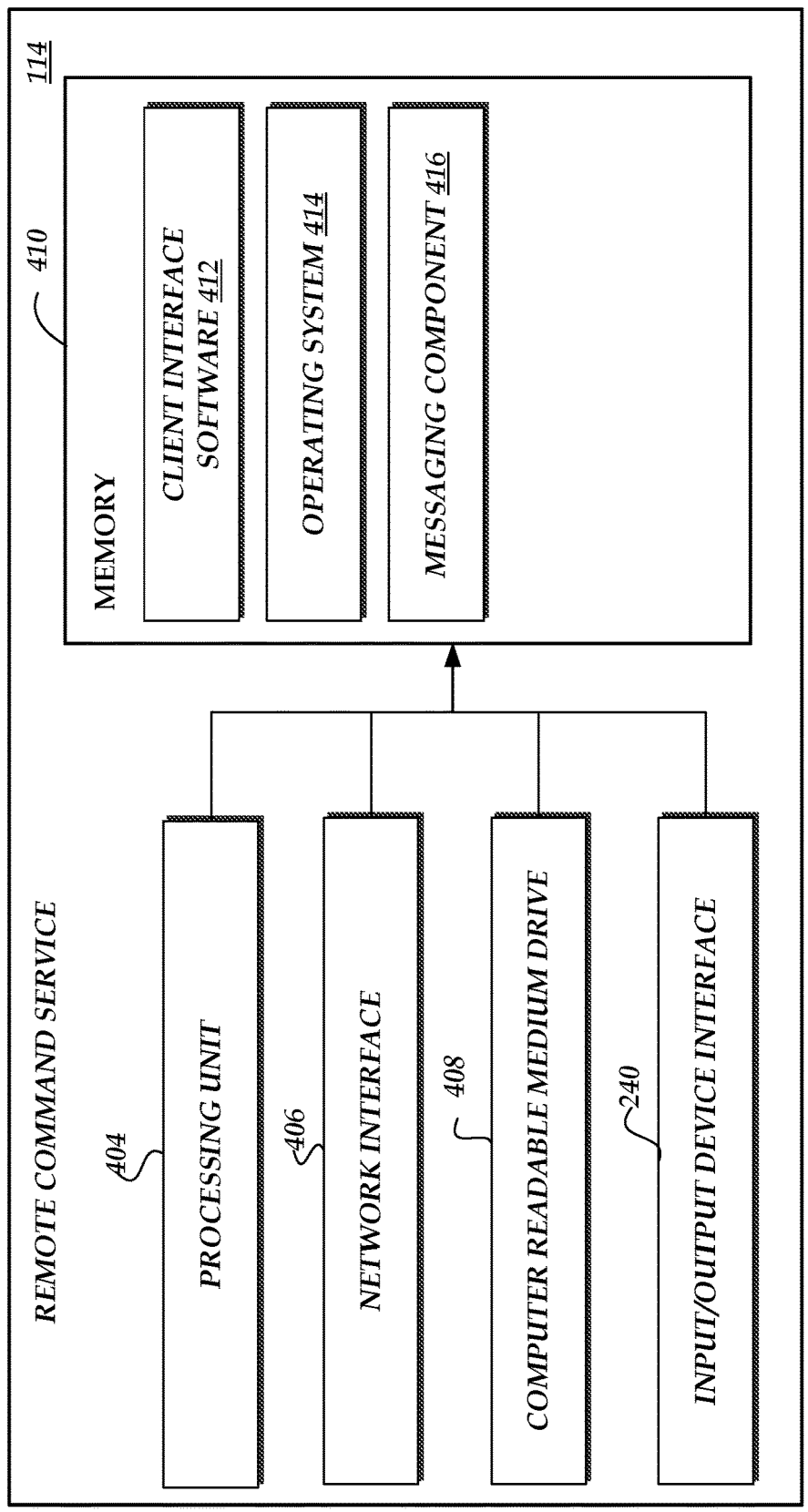
FIG. 4 is a block diagram of illustrative components of a remote command service computing device configured to provide content in accordance with an illustrative embodiment.

FIG. 4 depicts one embodiment of an architecture of an illustrative server for implementing the messaging broker services 114 component described herein. The general architecture of the messaging broker 114 depicted in FIG. 4 includes an arrangement of computer hardware and software components that may be used to implement aspects of the present disclosure. As illustrated, the messaging services 114 includes a processing unit 404, a network interface 406, a computer readable medium drive 407, an input/output device interface 420, an optional display 402, and an input device 424, all of which may communicate with one another by way of a communication bus. The components of the messaging services 114 may be physical hardware components or implemented in a virtualized environment.

The network interface 406 may provide connectivity to one or more networks or computing systems, such as the network 130 of FIG. 1. The processing unit 404 may thus receive information and instructions from other computing systems or services via a network. The processing unit 404 may also communicate to and from memory 410 and further provide output information for an optional display via the input/output device interface 420. The input/output device interface 420 may also accept input from the optional input device 424, such as a keyboard, mouse, digital pen, etc. In some embodiments, the messaging services 114 may include more (or fewer) components than those shown in FIG. 4.

The memory 410 may include computer program instructions that the processing unit 404 executes in order to implement one or more embodiments. The memory 410 generally includes RAM, ROM, or other persistent or non-transitory memory. The memory 410 may store an operating system 414 that provides computer program instructions for use by the processing unit 404 in the general administration and operation of the messaging services 114. The memory 410 may further include computer program instructions and other information for implementing aspects of the present disclosure. For example, in one embodiment, the memory 410 includes client interface software 412 for receiving and processing content requests from client devices 102. Additionally, the memory 410 includes a messaging component 416 for processing messages from the client device 102.

Figure 5B:
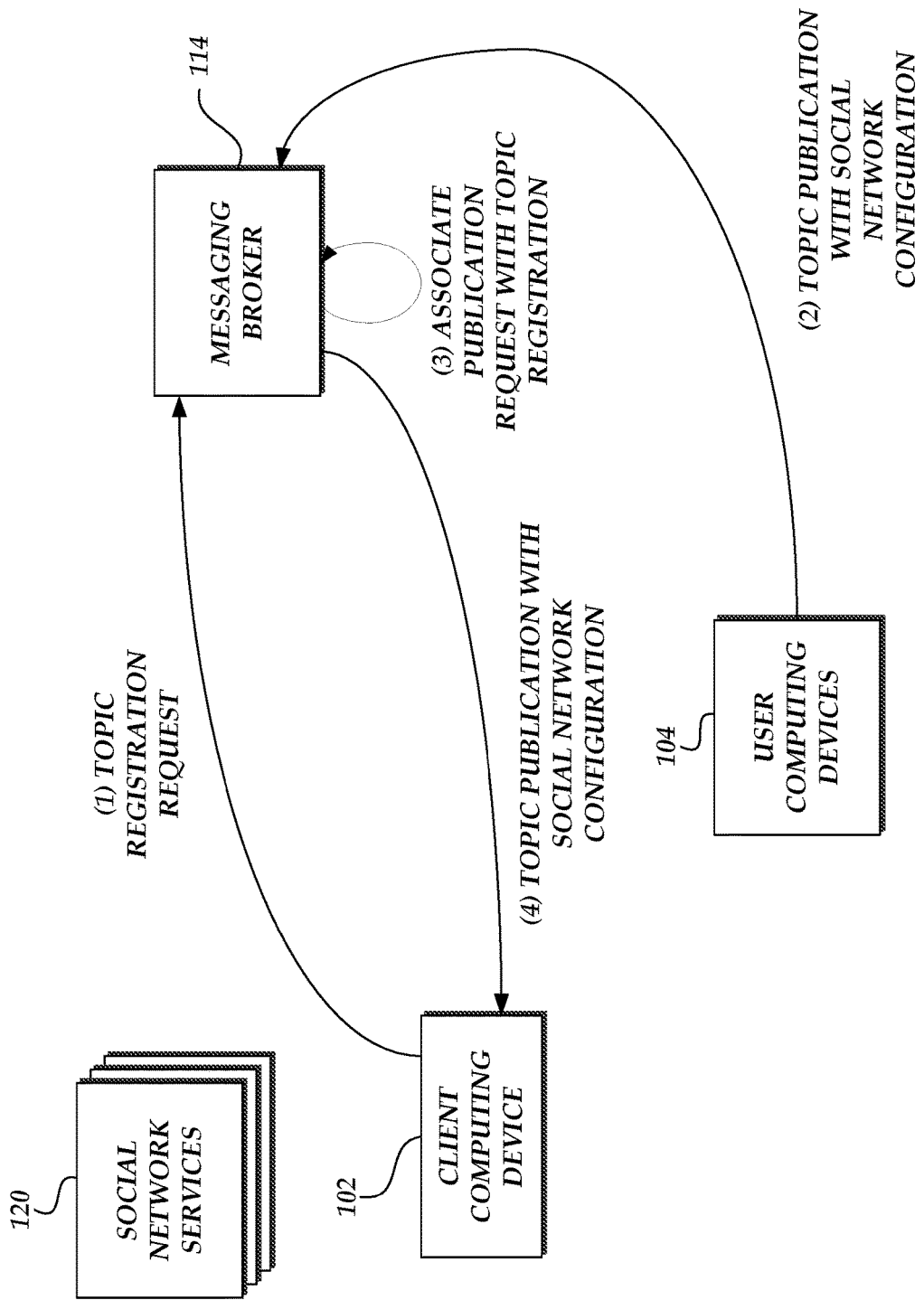
Figure 5C:
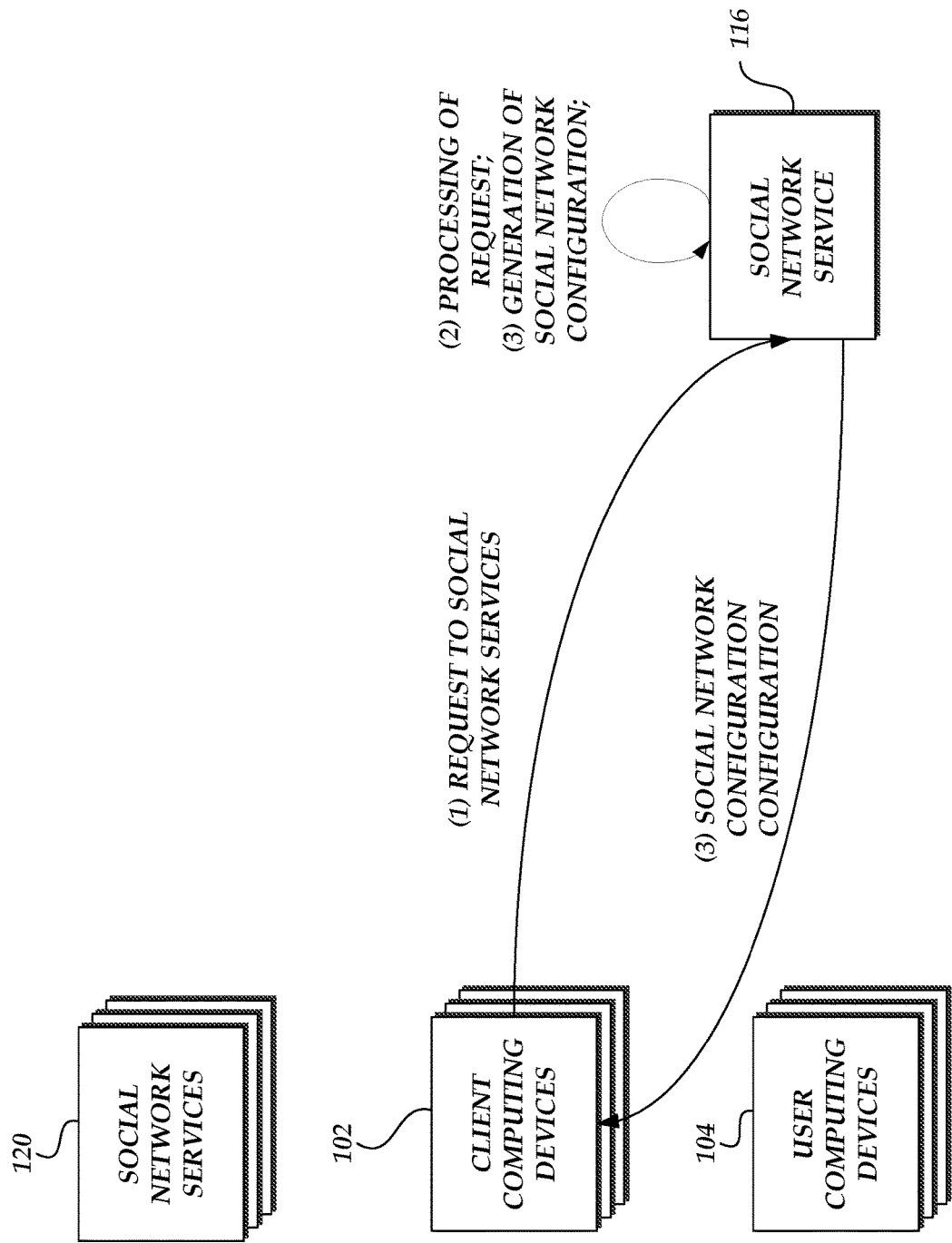

Turning now to FIGS. 5A-5C, illustrative interactions between the client devices 102 (either FIG. 2 or FIG. 2A) to configure the client devices to established contact with one or more social networks 120 will be described. More specifically, FIGS. 5A-5C will be described with regard to interactions between a client computing device 102, one or more social networks 120 and the content managements system 110 to allow one or more client devices 102 to attempt to establish a communication channel with a specified user or system administrator (herein "users") via a social network or set of social networks. Additionally, although depicted as a single interaction between a client computing device 102, content management system 110, and social networks 120, in some embodiments, a plurality of client computing devices 102 can be configured using the same processes illustrated in FIG. 5A, 5B, or 5C. Still further, in some embodiments, the content management system 110 may also provide virtual representations of the client devices 102 such that the interaction depicted at the client device may be executed or implemented, at least partially, by computing devices provided by the content management system and the processing result provided to the physical client device 102.

With reference to FIG. 5A, at (1), the client computing device 102 generates a device connection request and transmits the request to the messaging broker services 114. Illustratively, the device connection request corresponds to established procedures associated with the authentication and authorization of the client computing device 102 with the messaging broker services 114. Still further, in some embodiments, the logical network 100 can include additional gateway components that independently, or as part of the content management system 110, manage the transmission of the messages to the messaging broker services 114. Such gateway components can implement security functionality, load balancing, or other network processing services.

At (2), the remote command services 114 processes the connection request such as by validating security information, requesting additional information or determining the characteristics of the requesting client computing device 102. At (3), if the connection request is acceptable and authorized, the messaging broker services 114 transmits a connection confirmation to the requesting client computing device 102. In this regarding, once authorized, the client computing device and messaging broker services 114 can begin communication within the procedures defined in a messaging protocol, such as MQTT.

With reference now to FIG. 5B, after receiving the connection confirmation, at (1), the client computing device 102 transmits one or more topic registration requests to the remote command services 114. Illustratively, the topic registration is defined in accordance with the messaging protocol such that the client computing device 102 can register to receive content published according to specific topics by any number of content providers. As applied to the present application, the client computing devices 102 registers for one or more topics that have been identified for specific social network configuration, generally referred to as "social network topics." In one embodiment, the client computing devices 102 can be pre-configured to register for social network topics. In other embodiments, individual users may interact with the client computing devices 102 to configure the client computing devices to register for the social network topics. The update topics can be unique to individual client computing devices 102. Alternatively, the update topics can apply to multiple client computing devices 102 or sets of client computing devices 102, such as all devices in a particular geographic location or associated by some organizational criteria.

At some point after registration, at (2), a user 104 publishes one or more pieces content to the messaging service 114. Each published piece of content is associated with a topic. For purpose of an illustrative example, at least one published content is associated with a social network topic (e.g., a topic related to providing social network configuration of the client devices) and that is a registered topic of the client computing devices 102. Additionally, the published piece of content associated with the social network topic includes or otherwise references information that will allow the client computing device to establish contact with a social network 120 (directly or indirectly) and either make the client device 102 available for connections or configured the client device 102 to request connections with the user. For example, the content can include social network account identifiers that allow the client device to request connections with the accounts associated with the identifiers. In another example, the content can include social media account permissions that defines the accounts from which the client device will accept connection requests. The content can also include instructions that identify the logistics of the social network requests, including timing information, specified communication medium to use, or other processing instructions.

At (3), the messaging broker services 114 matches the registered topics with the published topics to determine that the client computing devices 102 should receive the published content with the social network topic. By way of illustrative example, the messaging broker services 114 can utilize a variety of mechanism to match registered topics with incoming published content, such as matrices, data stores, etc. At (4), the messaging broker service 114 transmits the published content. Illustratively, the transmittal of the published content is done in accordance with the procedures and capabilities of the messaging protocol, such as MQTT, and does not require additional or alternative communications to cause the transmission of the social network information. Once the content has been received at the client computing device 102, the content can be processed to extra the social network configuration information. Additionally, the client computing device 102 can utilize additional identification information included in the published content to request additional information that may be utilized as part of the configuration process. In other embodiments, the content managements system 110 may provide some form of additional or alternative processing resources to facilitate that the processing of the published content. In this embodiment, the content managements system 110 may host a virtualized version (or partial version) of the client computing device 102 to process the requested content. The content managements system 110 can then return a processing result in the form of the configuration information to be implemented by the physical client device 102.

With reference to FIG. 5C, another embodiment for configuring social network connections will be described. In this embodiment, the client devices 102 may be preconfigured to transmit a request to the social network services 116 of the content management systems 110. In this aspect, the social network services 116 can function as the clearing house of social network configuration information for a variety of client devices 102. The social network services 116 can then identify one or more aspects of the client device 102 and provide social network information to the client device.

At (1), the client device 102 transmits a request to the social network service 116. The transmission of the request may correspond to implementation of a startup routine conduct by the client device. The request can include identifiers or other information that will allow the social network services 116 to identify information to configure the social networks to the client device. At (2), the social network services 116 processes the request and at (3) generates social network configuration information for the client device 102. Illustratively, the information includes or otherwise references information that will allow the client computing device to establish contact with a social network 120 and either make the client device 102 available for connections or configured the client device 102 to request connections with the user. For example, the content can include social network account identifiers that allow the client device to request connections with the accounts. In another example, the content can include social media account permissions that defines the accounts from which the client device will accept connection requests. At (4), the information is transmitted to the client device. In a manner similarly described with regard to FIGS. 5A and 5B, in other embodiments, the content managements system 110 may provide some form of additional or alternative processing resources to facilitate that the processing of the published content. In this embodiment, the content managements system 110 may host a virtualized version (or partial version) of the client computing device 102 to process the requested content. The content managements system 110 can then return a processing result in the form of the configuration information to be implemented by the physical client device 102.

Turning now to FIGS. 6A-6F, illustrative interactions between the components of the logical network 100 to share content via social networks 120 will be described. More specifically, with reference to FIG. 6A, an embodiment illustrating how a client device 102 utilizes social network configuration information (FIGS. 5A-5C) will be described. At (1), the client device 102 utilizes the social network information to establish communications with a social network. In some embodiments, the client device 102 may have a social network accounted previously created and can log into the pre-configured account with necessary authentication/authorization information. In another embodiment, the social network information can include information to establish the account, on behalf of the client device 102, with the social network 120. In embodiments in which the client device 102 initiates the establishment of social network communication, the identity of the user account may be included in the request (or be transmitted thereafter). In embodiments in which the client device awaits initiation of a request from a user device, the request can include publication information that identifies how the client device should be advertised to potential users. Additionally, as described above, in still some embodiments, the communication with the social network 120 may be facilitated through the content managements system 110.

At (2), the social network 120 processes the result and can transmit the social network request to a user device 104 at (3). In other embodiments, the social network 120 processes the results and begin advertising the availability to accept connection requests such as to user device 104 at (3). One skilled in the relevant art will appreciate that the number and type of interactions between the social network 120, client device 102 and user device 104 can vary, especially depending on the type of social network, the communication medium utilized to communicate the requests and the capabilities of the client device 102. At (4), the user device 104 can accept the request or transmit a request to the client device in alternative embodiments. Illustratively, the client device 102 can take on an active role in seeking connections, a passive role in accepting connection requests or a combination thereof.

Figure 6B:
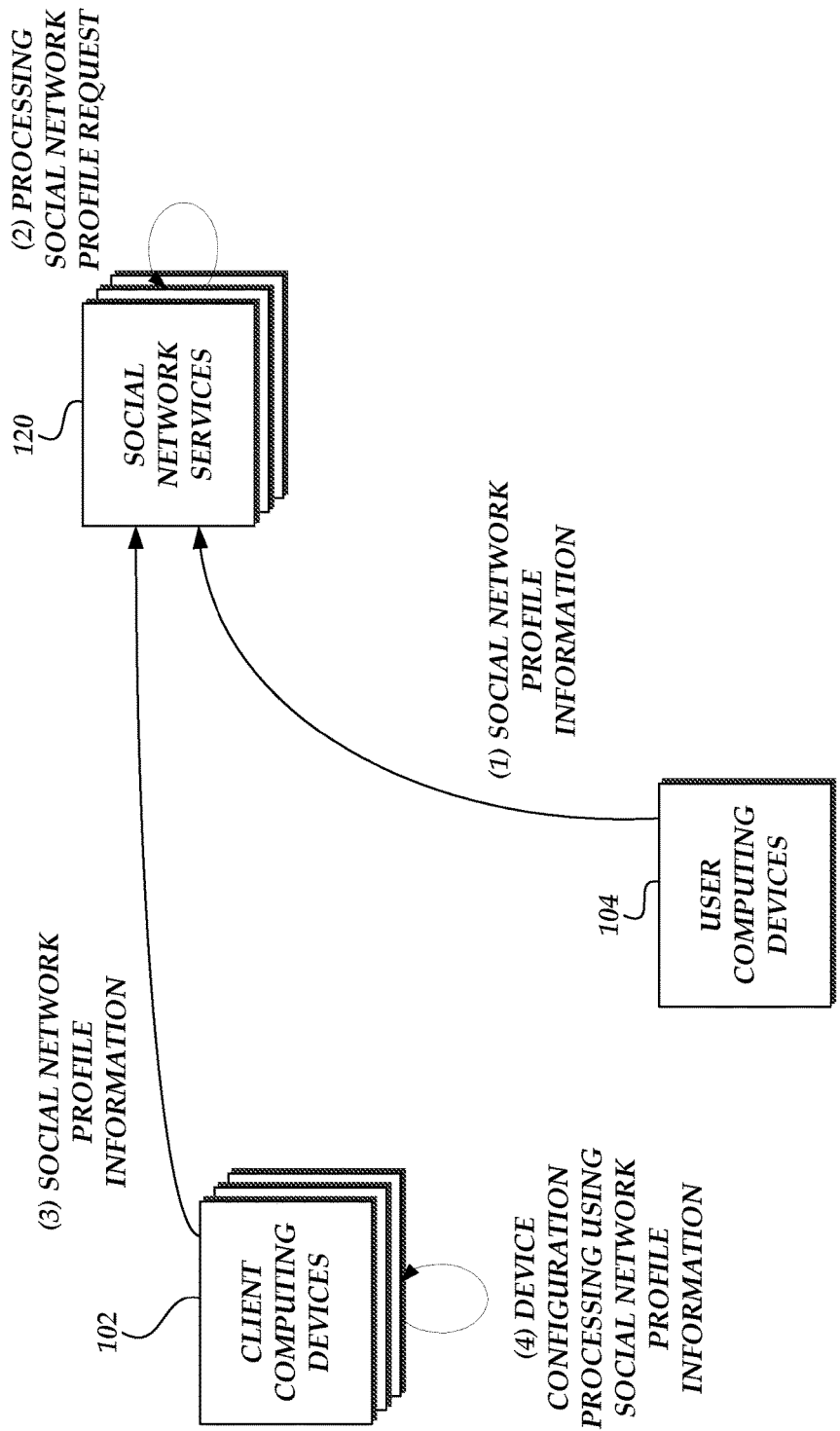

With reference to FIG. 6B, in some embodiments, the social network profiles may be utilized to facilitate the configuration of the operation of a client device 102. Illustratively, in this embodiment, the specified user or administrator may been given limited authority to modify social media profile information or may be associated with authority such that inputs from the user device 104 or information from a user profile may modify social media profile information. In some of these embodiments, the social network profiles may correspond to generic social network profiles that are not unique or specialized for the configuration of client devices 102. In other embodiments, at least some aspects of the social network profiles can be configured specifically for the configuring client devices 102, such as custom fields specified or selected to carry configuration information.

Turning to FIG. 6B, at (1), the user device 104 can access social profile information and based on authorization, provide some modification to the information maintained by the social network 120. For example, if the social network profile includes operational parameters such as operating ranges, timers, input preferences, output preferences, related device information, then the user device can access the tools and services provided by the social network 120 to modify or supplement a parameter. Illustratively, the user device 104 can generate various user interfaces for publishing existing aspects of the social network profile and obtaining one or more inputs or modifications to the information included in the social network profile.

In further embodiments, the user of the user device 104 (or user device 104) can be associated with one or more social network profiles ("user profiles") with respective social networks 120. In this embodiment, at least some portion of the user profiles can be utilized to modify or populate a social network profile of the user device 102. For example, a user may maintain a special configuration social network profile that provides common configuration information for client devices 102. In another example, a user may maintain multiple, special configuration social network profiles that individually provide common configuration information for classes of client devices 102. In still another example, the user may utilize aspects of a general or generic social network profile to provide configuration information for client devices 102. The selection of the configuration information from the user social network profile may be automatically merged or extracted. In other embodiments, the user device 104 may provide user input regarding which information may be utilized or added to the client device social network profiles.

At (2), the social network 120 processes the update and makes appropriate changes to the profile information. Illustratively, the social network 120 can validate the information being provided for the client device social network profiles. For example, the social network 120 can maintain minimum or maximum threshold criteria that specifies limits to the setting of a client device configuration. In another aspect, the social network 120 can further modify or create variations of the information being updated. Additionally, in still another aspect, the social network 120 can change security or authorization information to change the social profile information.

At (3), the client device 102 can access or receive the social network profile information. At (4), the client device 102 parses the information in the social network profile to extract operational parameters or commands. As previously discussed, in some embodiments, the client device 102 can include sufficient functionality to access the social network profile information, parse the information to extract configuration information and implement the configuration information. In other embodiments, the content managements system 110 (or other service provider) can provide virtualization resources that implement at least a portion of the functionality utilized by the physical client device 102 to receive the social network profile information, extract configuration information and cause implementation of the configuration information on the client device.

Figure 6C:
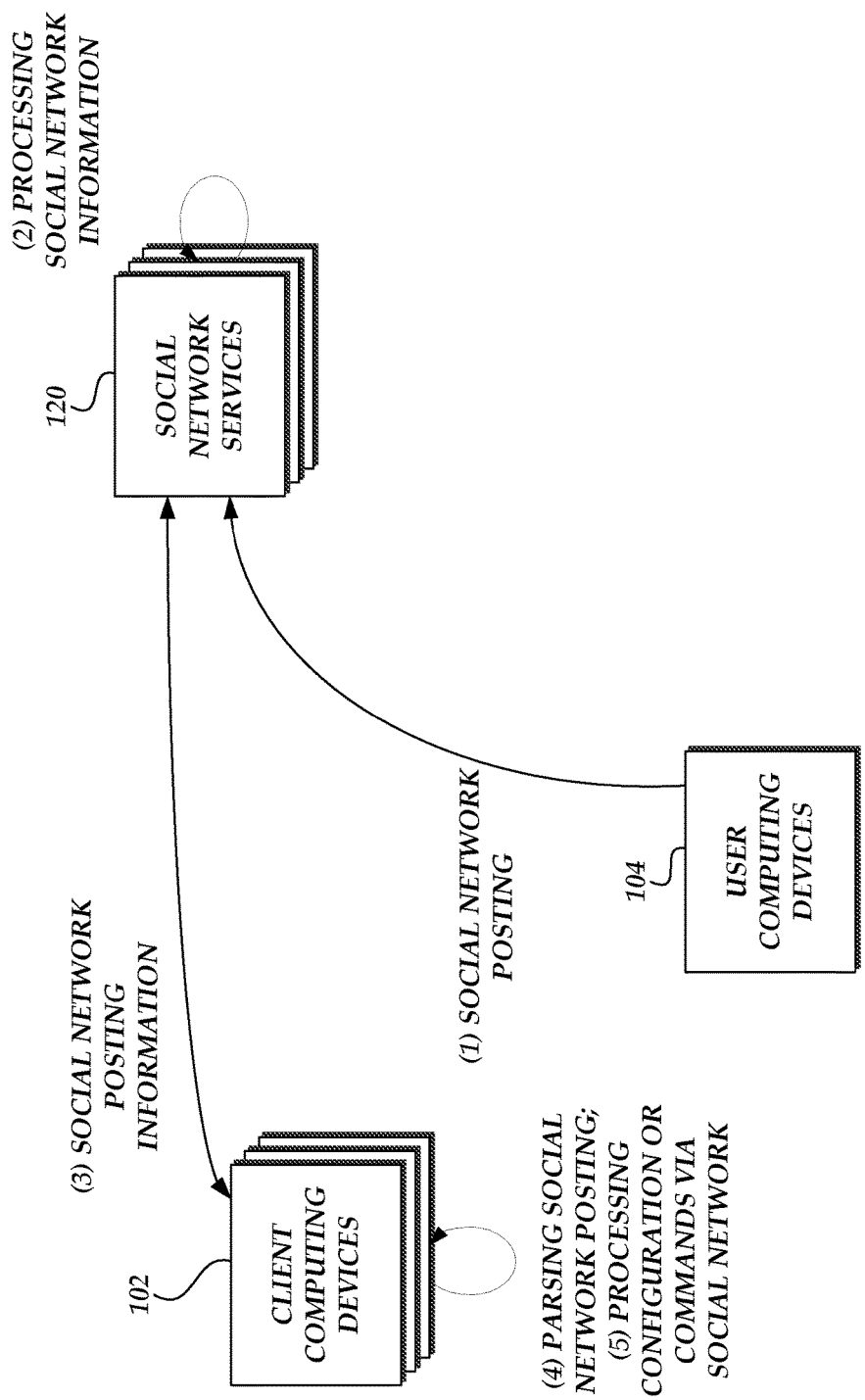

With reference to FIG. 6C, in some embodiments, the social network communications may be utilized to facilitate the configuration of the operation of a client device 102 or provide information related to the operation of the client device. Illustratively, in this embodiment, the specified user or administrator has been given limited authority to receive social media communications.

Turning to FIG. 6C, at (1), the user device 104 can publish social network communications, such as limited character posts, private messages, group messages and provide information to the social network 120. For example, the user device 104 can include messaging referring to or referencing operational parameters such as operating ranges, timers, input preferences, output preferences, related device information. At (2), the social network 120 processes the information. Illustratively, the social network 120 can make validations or variations of the information or the authority to publish context information to the client device 102. In some embodiments, the social network 120 may have one or more processing rules that define acceptable ranges of operational parameters, acceptable times for implementing parameter changes, acceptable user devices or keywords and the like. In these embodiments, the social network 120 can apply the processing rules to the published social network information and make changes, filter or otherwise reject the messages provided by the client device 104.

At (3), the client device 102 can access or receive the social network profile information. At (4), the client device 102 parses the information in the social network profile to extract operational parameters or commands. As previously discussed, in some embodiments, the client device 102 can include sufficient functionality to access the social network profile information, parse the information to extract configuration information and implement the configuration information. In other embodiments, the content managements system 110 (or other service provider) can provide virtualization resources that implement at least a portion of the functionality utilized by the physical client device 102 to receive and process the operational parameter information published in the social network messages. In this embodiment, the content management system 110 can implement a virtual version of the client device 102 or implement functionality to process and send the operational parameter information.

At (5), the client device 102 implements the extracted information operational parameters. Additionally, the client device 102 can also publish via the same (or different) communication link information related to the status of the implementation of the command or configuration such as a progress report, etc. For example, the client device 102 can publish a confirmation code or an acknowledgement message intended for the client device 104 or other recipients.

Figure 6D:
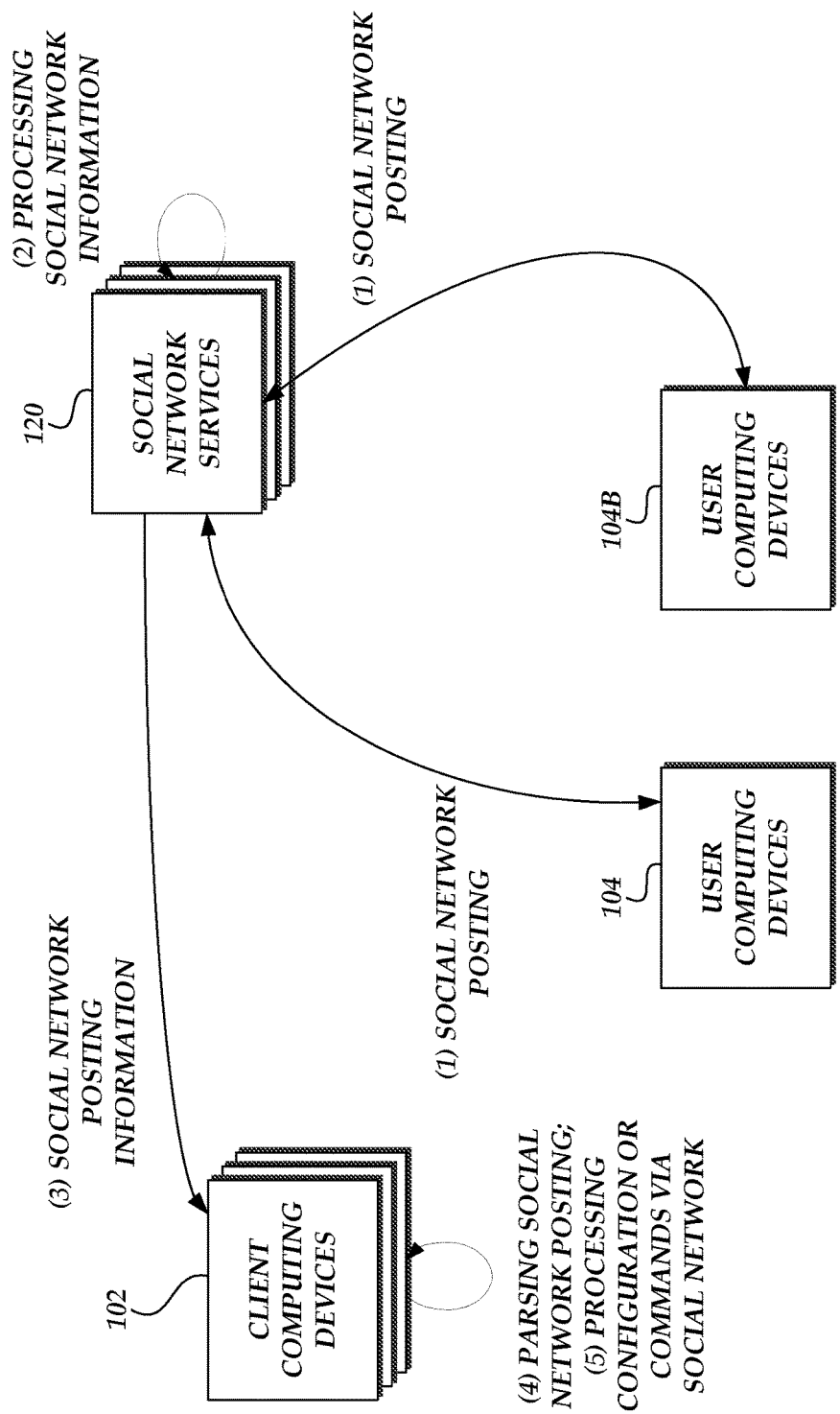

With reference to FIG. 6D, in some embodiments, social network communications between two user devices 104 may be utilized to facilitate the configuration of the operation of a client device 102 or provide information related to the operation of the client device 102. Illustratively, in this embodiment, the client device 102 can receive communications exchanged between two user devices 104 and 104B via a social network 120. In this embodiment, the client device 102, user device 104 and user device 104B have been given at least limited or temporary authority to receive social media communications.

Turning to FIG. 6D, at (1), the user device 104 can publish social network communications, such as limited character posts, private messages, group messages and provide information to the social network 120. For example, the user device 104 can include messaging referring to or referencing operational parameters such as operating ranges, timers, input preferences, output preferences, related device information, or other information related to activity. In this embodiment, the communication may not be directed directly to the client device 102, but to another social network user 104B or some identifier that may be common to both. At (2), the social network 120 processes the information. Illustratively, the social network 120 can make validations or variations of the information or the authority to change the social profile information. As previously described, in some embodiments, the social network 120 may have one or more processing rules that define acceptable ranges of operational parameters, acceptable times for implementing parameter changes, acceptable user devices or keywords and the like. In these embodiments, the social network 120 can apply the processing rules to the published social network information and make changes, filter or otherwise reject the messages provided by the client device 104. Additionally, in some embodiments, the social network may also configured, such as using social network profile information, to supplement the network message with missing or omitted operational parameters. For example, if the social network message includes an instruction to being operation at the client device 102, the social network profile may indicate that the operation of the device have a fixed time limit. Accordingly, in this example, the social network message may be supplemented with the appropriate ending time based on social network profile information.

Figure 6E:
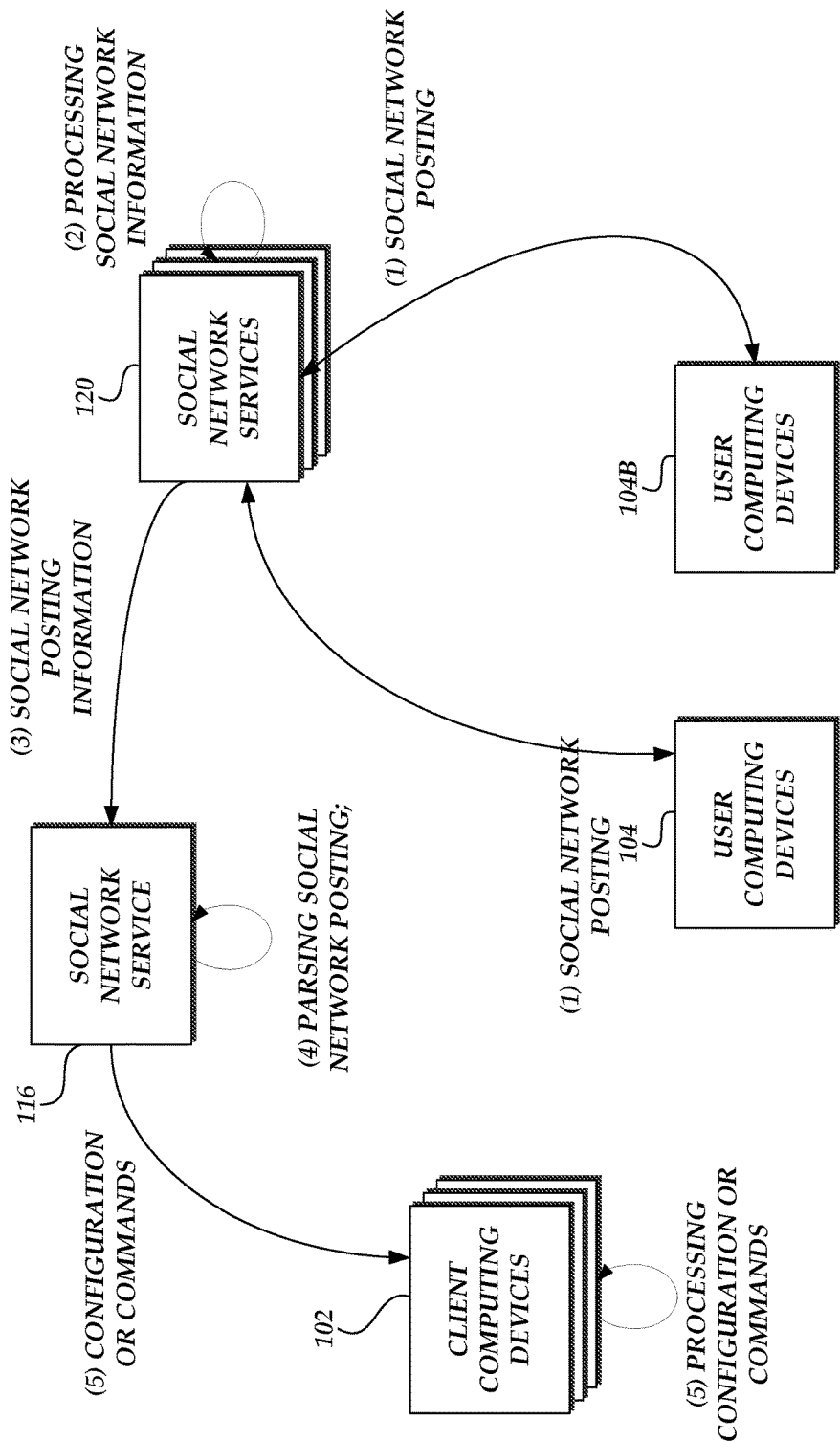

At (3), the client device 102 can access or receive the social network profile information. At (4), the client device 102 parses the information in the social network profile to extract operational parameters or commands. At (5), the client device 102 implements the extract information. For purposes of illustrating many of the above-mentioned embodiments and alternatives, FIG. 6E illustrates the utilization of the social network service 116 to facilitate the processing of the social network information and provide the processed or extracted information to the client device 102. Although illustrated with regard to FIG. 6E, one skilled in the art will appreciate that utilization of a service, such as social network service 116, Additionally, the client device 102 can also publish via the same (or different) communication link information related to the status of the implementation of the command or configuration such as a progress report, etc.

Figure 6F:
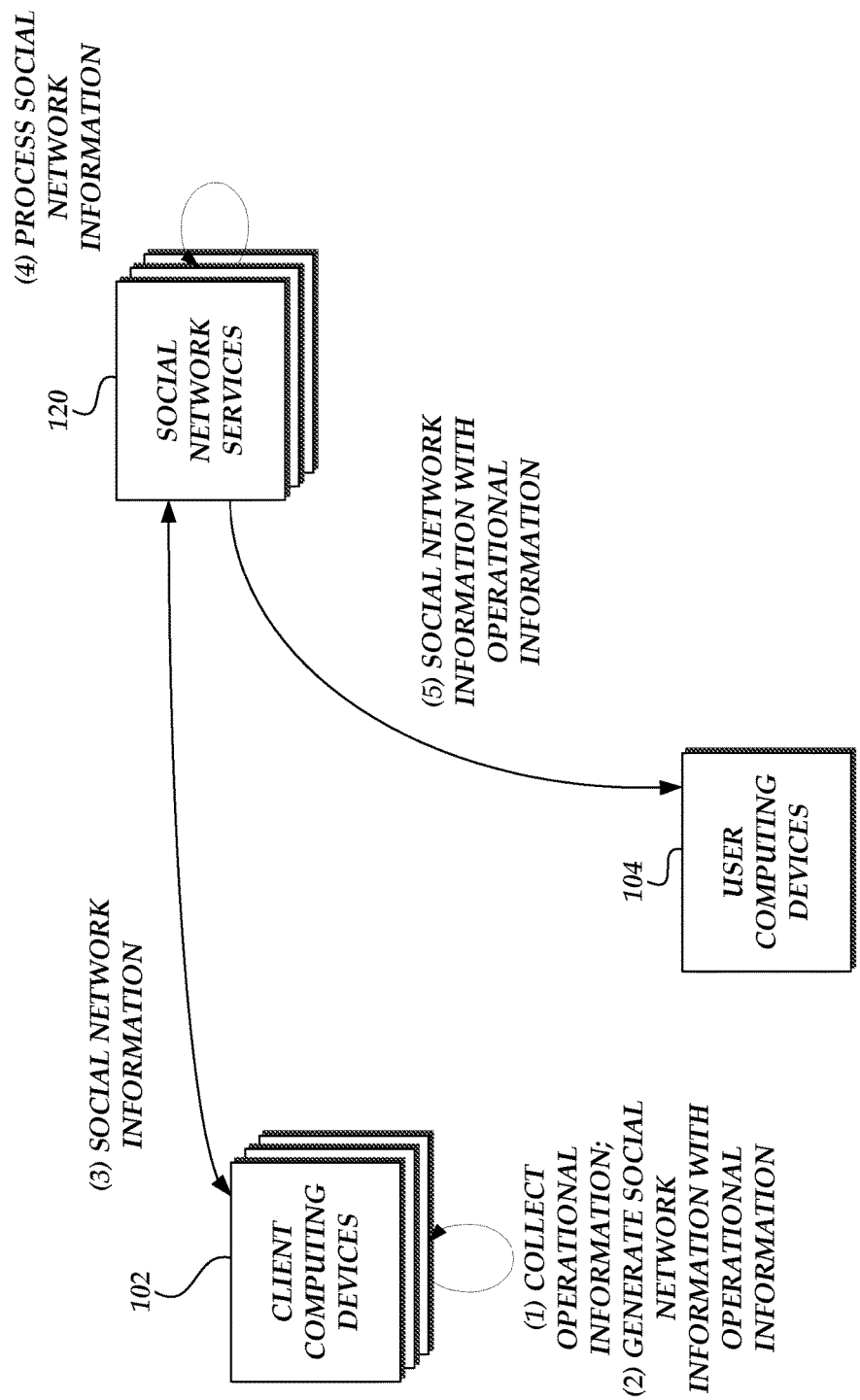

With reference to FIG. 6F, in some embodiments, the social network communications may be utilized to facilitate the publication of information related to the operation of a client device 102 or provide information related to the operation of the client device. Illustratively, in this embodiment, the client device can transmit communications to specified user or administrator via social network communications.

Turning to FIG. 6F, at (1) and (2), the client device 102 can generate and publish social network communications, such as limited character posts, private messages, group messages and provide information to the social network 120. For example, the client device 102 can include messaging referring to or referencing operational parameters such as operating ranges, timers, input preferences, output preferences, related device information, error conditions, instrumentation, or other information related to activity. As previously discussed, in some embodiments, the client device 102 can include sufficient functionality to generate the operational parameters embedded in the social network messages. In other embodiments, the content management system 110 (or other service provider) can provide virtualization resources that implement at least a portion of the functionality utilized by the physical client device 102 to generate the social network information and publish on behalf of the client device 102.

At (3), the social network 120 processes the information. Illustratively, the social network 120 can make validations or variations of the information or the authority to change the social profile information. At (4), the user device can access or receive the social network information. At (5), the user device 102 can display, store or archive the published parameters.

FIG. 7 is a flow diagram illustrative of a social network configuration routine 700 implemented by a client device 102 in accordance with an illustrative embodiment. In some embodiments, one or more of the functions of the client device 102 may be implemented by a service provider, such as the content management system 110. Accordingly, the action attributed to the client device 102 can be considered to be implemented either directly by the client device 102 or indirectly via a service provider. At block 702, obtains social network configuration information. As illustrated in FIGS. 5A-5B, in one embodiment, the client device 102 can obtain the social network configuration information from a messaging protocol. As illustrated in FIG. 5C, in another embodiment, the client device 102 can obtain the social network configuration information via a social network services. In still further embodiments, the client device 102 can be configured by a manufacturer. In yet further embodiments, the client device may receive social network information from individual user manipulation of input devices.

At block 704, at block 704, the client device 102 transmits a request to join (or a request to be asked) a social network. In some embodiments, the client device 102 may have a social network accounted previously created and can log into the pre-configured account with necessary authentication/authorization information. In another embodiment, the social network information can include information to establish the account, on behalf of the client device 102, with the social network 120. In embodiments in which the client device 102 initiates the establishment of social network communication, the identity of the user account may be included in the request (or be transmitted thereafter). In embodiments in which the client device awaits initiation of a request from a user device, the request can include publication information that identifies how the client device should be advertised to potential users.

At block 706, the client device 102 generates or receives social network profile information for one or more social networks. In some of these embodiments, the social network profiles may correspond to generic social network profiles that are not unique or specialized for the configuration of client devices 102. In other embodiments, at least some aspects of the social network profiles can be configured specifically for the configuring client devices 102, such as custom fields specified or selected to carry configuration information. Still further, in some embodiments, the client device 102 can incorporate aspects of another social network profile, such as the social profile information for an authorized user (e.g., a system administrator).

At block 708, the client publishes the social media profile information. As previously discussed, the user device 104 can access social profile information and based on authorization, provide some modification to the information maintained by the social network 120. For example, if the social media profile includes operational parameters such as operating ranges, timers, input preferences, output preferences, related device information, then the user device can access the tools and services provided by the social network 120 to modify or supplement a parameter. At block 708, the routine terminates.

FIG. 8 is a flow diagram illustrative of a social network information processing routine 800 implemented by a client device in accordance with an illustrative embodiment. Illustratively, the user device 104 can publish social network communications, such as limited character posts, private messages, group messages and provide information to the social network 120. For example, the user device 104 can include messaging referring to or referencing operational parameters such as operating ranges, timers, input preferences, output preferences, related device information, or other information related to activity. In this embodiment, the communication may not be directed directly to the client device, but to other social network users 104B. At block 802, the client device 102 can access or receive the social network information published by the social network 120. As previously described, in some embodiments, the social network 120 may have one or more processing rules that define acceptable ranges of operational parameters, acceptable times for implementing parameter changes, acceptable user devices or keywords and the like. In these embodiments, the social network 120 can apply the processing rules to the published social network information and make changes, filter or otherwise reject the messages provided by the client device 104. Additionally, in some embodiments, the social network may also configured, such as using social network profile information, to supplement the network message with missing or omitted operational parameters. For example, if the social network message includes an instruction to being operation at the client device 102, the social network profile may indicate that the operation of the device have a fixed time limit. Accordingly, in this example, the social network message may be supplemented with the appropriate ending time based on social network profile information. At block 804, the client device 102 parses the information in the social network profile to extract operational parameters or commands. As previously described, in some embodiments, the client device 102 may indirectly process the information through the utilization of a service provider that implements at least a portion of the processing functionality.

At block 806, the client device 102 implements the extract information. Additionally, at block 808, client device 102 can also publish via the same (or different) communication link information related to the status of the implementation of the command or configuration such as a progress report, etc. The routine 800 terminates at block 810.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for managing the configuration of client devices utilizing social networks comprising:
one or more social network services configured to receive and publish content based on associated social network accounts; and
one or more computing devices associated with a specified user, wherein the specified user is associated with at least one account on the one or more social network services;
at least one client device having a data connectivity application that can access the one or more social network services,
wherein the client device is configured to:
receive social network information associated with the specified user;
establish a communication link with the one or more social networks based on the social network information;

associate a social network account corresponding to the client device with a social network account corresponding to the specified user, wherein associating the social network comprises, based at least in part on the received social network information, automatically initiating or accepting a request to associate the social network account corresponding to the client device with the social network account corresponding to the specified user;

obtain configuration information provided through the one or more social network services, wherein obtaining the configuration information comprises parsing a natural language message sent from the social network account corresponding to the specified user to the social network account corresponding to the client device; and cause implementation of a change in a configuration of the client device based on the configuration information provided through the one or more social networks.

2. The system of claim 1, wherein the received social network information comprises an identifier of the social network corresponding to the specified user, and wherein the client device associates the social network account corresponding to the client device with the social network account corresponding to the specified user by transmitting, responsive to receiving the identifier, a request to join a social network account corresponding to the specified user.

3. The system of claim 1, wherein the received social network information comprises a permission to accept requests from the social network account corresponding to the specified user.

4. The system of claim 1, wherein the client device is associated with a social network profile, the social network profile indicative of operational parameters of the client device.

5. A computer-implemented method for managing configuration of computing devices comprising:

receiving, at a client device, social network information associated with a specified user;

associating, by the client device, a social network account corresponding to the client device with a social network account corresponding to the specified user, wherein the associating the social network comprises, based at least in part on the received social network information, automatically initiating or accepting a request to associate the social network account corresponding to the client device with the social network account corresponding to the specified user;

obtaining, by the client device, configuration information provided through the one or more social networks, wherein obtaining the configuration information comprises parsing a natural language message sent from the social network account corresponding to the specified user to the social network account corresponding to the client device; and causing, by the client device, implementation of a change in a configuration of the client device based on the configuration information provided through the one or more social networks.

6. The computer-implemented method of claim 5, wherein receiving the social network information includes receiving a message in accordance with the MQ Telemetry Transport protocol, the message including the social network information.

7. The computer-implemented method of claim 5, wherein the social network information includes timing information, and wherein the client device initiates or accepts the request in accordance with the timing information.

8. The computer-implemented method of claim 5, wherein associating with the social network account includes transmitting a request to join a social network account corresponding to the specified user.

9. The computer-implemented method of claim 8, wherein transmitting the request to join a social network account corresponding to the specified user is based on one or more social network account identifiers included in the social network information.

10. The computer-implemented method of claim 5, wherein associating with the social network account includes accepting a request to join a social network account corresponding to the specified user.

11. The computer-implemented method of claim 5, wherein the social network information includes permission information identifying one or more social network accounts in which the client device is allowed to accept social network requests.

12. The computer-implemented method of claim 5, wherein the client device is associated with a social network profile, the social network profile indicative of operational parameters of the client device.

13. The computer-implemented method of claim 12 further comprising publishing, by the client device, the social network profile information to the specified user.

14. The computer-implemented method of claim 13, wherein obtaining configuration information provided through the one or more social networks includes:

obtaining, by the client device, information indicative of a modification of the social network profile associated with the client device;

extracting, by the client device, configuration information from the modification of the social network profile.

15. The computer-implemented method of claim 12, wherein the client device is associated with a group of client devices, and wherein at least one portion of the social network profile information is shared by the group of client devices.

16. A computer-implemented method for managing the execution of commands utilizing message protocols comprising:

associating a social network account corresponding to a client device with a social network account corresponding to a specified user, wherein associating the social network comprises, based at least in part on received social network information associated with the specified user, automatically initiating or accepting a request to associate the social network account corresponding to the client device with the social network account corresponding to the specified user;

obtaining, by the client device, configuration information maintained on behalf of the client device through the social network account corresponding to the specified user, wherein obtaining the configuration information comprises parsing natural language information received at the social network account corresponding to the client device; and causing, by the client device, implementation of a change in a configuration of the client device based on the configuration information maintained through the social network account corresponding to the specified user.

17. The computer-implemented method of claim 16, wherein the received social network information causes the client device to initiate the request.

18. The computer-implemented method of claim 16, wherein the received social network information includes one or more instructions specifying logistics of the request.

19. The computer-implemented method of claim 18, wherein the one or more instructions comprise at least one of timing information and a specified communication medium.

20. The computer-implemented method of claim 16, wherein obtaining the configuration information includes obtaining configuration information from a service provider configured to process the configuration information on behalf of the client device.

* * * * *